US00RE44833E

(19) United States
(12) Reissued Patent
Muir et al.

(10) Patent Number: US RE44,833 E
(45) Date of Reissued Patent: Apr. 8, 2014

(54) REEL STRIP INTERACTION

(75) Inventors: Robert Linley Muir, North Ryde (AU); Colin Fong, Penshurst (AU); Natalie Bryant, Cherrybrook (AU)

(73) Assignee: Aristocrat Technologies Australia Pty Ltd. (AU)

(21) Appl. No.: 12/407,125

(22) Filed: Mar. 19, 2009

Related U.S. Patent Documents

Reissue of:
(64) Patent No.: 7,192,345
Issued: Mar. 20, 2007
Appl. No.: 10/013,594
Filed: Dec. 7, 2001

(51) Int. Cl.
*G06F 17/00* (2006.01)

(52) U.S. Cl.
USPC ..... 463/20; 463/33

(58) Field of Classification Search
USPC ..... 463/16–22, 30–34
See application file for complete search history.

(56) References Cited

U.S. PATENT DOCUMENTS

| | | | |
|---|---|---|---|
| 1,681,683 | A | 8/1928 | Ramer |
| 3,580,581 | A | 5/1971 | Raven |
| 4,306,768 | A | 12/1981 | Egging |
| 4,448,419 | A | 5/1984 | Telnaes |
| 4,686,521 | A | 8/1987 | Beaven |
| 4,711,451 | A | 12/1987 | Pajak |
| 4,718,672 | A | 1/1988 | Okada |
| 4,743,024 | A | 5/1988 | Helm |
| 4,756,531 | A | 7/1988 | DiRe |
| 4,826,169 | A | 5/1989 | Bessho |
| 4,838,552 | A | 6/1989 | Hagiwara |
| 4,856,787 | A | 8/1989 | Itkis |
| 4,871,171 | A | 10/1989 | Rivero |
| 5,042,818 | A | 8/1991 | Weingardt |
| 5,088,737 | A | 2/1992 | Frank |
| 5,150,907 | A | 9/1992 | Desmaraies |

(Continued)

FOREIGN PATENT DOCUMENTS

| | | |
|---|---|---|
| AU | 1988/17509 | 12/1988 |
| AU | 1994/70382 | 8/1995 |

(Continued)

OTHER PUBLICATIONS

128 Fey, Marshall, Slot Machines A Pictorial History of the First 100 Years, 1983-1997, Liberty Belle Books, selected pages supplied by the Examiner as cited in U.S. Appl. No. 10/001,433.

(Continued)

*Primary Examiner* — Dmitry Suhol
*Assistant Examiner* — Alex F. R. P. Rada, II
(74) *Attorney, Agent, or Firm* — McAndrews, Held & Malloy, Ltd.

(57) ABSTRACT

A gaming machine having a display and a game controller arranged to control images displayed on the display. The game controller is arranged to play a game wherein at least one random event is caused to be displayed on the display and, if a predetermined winning event occurs, the machine awards a prize. During the playing of a first game, symbols related to the at first game are displayed on the display. When a trigger condition occurs, a feature game is commenced in which an arrangement of at least some of the symbols of the first game are incorporated as part of a larger image which comprises an image of the feature game, the at least some symbols of the first game contributing to an outcome of the feature game.

12 Claims, 10 Drawing Sheets

(56) References Cited

U.S. PATENT DOCUMENTS

| | | | | |
|---|---|---|---|---|
| 5,228,693 | A | 7/1993 | Howard | |
| 5,283,560 | A | 2/1994 | Bartlett | |
| 5,344,145 | A | 9/1994 | Chadwick | |
| 5,351,966 | A | 10/1994 | Tohyama | |
| 5,354,069 | A | 10/1994 | Guttman | |
| 5,375,830 | A | 12/1994 | Takemoto | |
| 5,380,007 | A | 1/1995 | Travis | |
| 5,395,111 | A | 3/1995 | Inoue | |
| 5,462,277 | A | 10/1995 | Takemoto | |
| 5,580,053 | A | 12/1996 | Crouch | |
| 5,596,693 | A | 1/1997 | Needle | |
| 5,630,753 | A | 5/1997 | Fuchs | |
| 5,664,999 | A | 9/1997 | Kurihara | |
| 5,673,401 | A | 9/1997 | Volk | |
| 5,704,835 | A | 1/1998 | Dietz | |
| 5,732,950 | A | 3/1998 | Moody | |
| 5,752,881 | A | 5/1998 | Inoue | |
| 5,803,809 | A | 9/1998 | Yoseloff | |
| 5,807,172 | A | 9/1998 | Piechowiak | |
| 5,807,178 | A | 9/1998 | Todokoro | |
| 5,816,915 | A | 10/1998 | Kadlic | |
| 5,816,916 | A | 10/1998 | Moody | |
| 5,823,873 | A | 10/1998 | Moody | |
| 5,836,586 | A | 11/1998 | Marks | |
| 5,848,932 | A | 12/1998 | Adams | |
| 5,853,325 | A | 12/1998 | Kadlic | |
| 5,867,166 | A | 2/1999 | Myhrvold | |
| 5,868,619 | A | 2/1999 | Wood | |
| 5,870,097 | A | 2/1999 | Snyder | |
| 5,880,709 | A * | 3/1999 | Itai et al. | 345/629 |
| 5,890,962 | A | 4/1999 | Takemoto | |
| 5,902,184 | A | 5/1999 | Bennett | |
| 5,935,002 | A | 8/1999 | Falciglia | |
| 5,951,397 | A | 9/1999 | Dickinson | |
| 5,971,849 | A | 10/1999 | Falciglia | |
| 5,980,384 | A | 11/1999 | Barrie | |
| 6,004,208 | A | 12/1999 | Takemoto | |
| 6,007,066 | A | 12/1999 | Moody | |
| 6,050,568 | A | 4/2000 | Hachquet | |
| 6,059,289 | A | 5/2000 | Vancura | |
| 6,062,978 | A | 5/2000 | Marino | |
| 6,089,977 | A | 7/2000 | Bennett | |
| 6,089,978 | A | 7/2000 | Adams | |
| 6,098,985 | A | 8/2000 | Moody | |
| 6,106,393 | A | 8/2000 | Sunaga | |
| 6,113,102 | A | 9/2000 | Marks | |
| 6,118,427 | A | 9/2000 | Buxton | |
| 6,120,031 | A | 9/2000 | Adams | |
| 6,120,378 | A | 9/2000 | Moody | |
| 6,123,333 | A | 9/2000 | McGinnis, Sr. et al. | |
| 6,126,542 | A | 10/2000 | Fier | |
| 6,135,883 | A | 10/2000 | Hachquet | |
| 6,135,884 | A * | 10/2000 | Hedrick et al. | 463/20 |
| 6,149,156 | A | 11/2000 | Feola | |
| 6,159,095 | A | 12/2000 | Frohm | |
| 6,159,097 | A | 12/2000 | Gura | |
| 6,159,098 | A | 12/2000 | Slomiany | |
| 6,162,121 | A | 12/2000 | Morro | |
| 6,164,645 | A | 12/2000 | Weiss | |
| 6,173,955 | B1 | 1/2001 | Perrie | |
| 6,190,254 | B1 | 2/2001 | Bennett | |
| 6,203,429 | B1 | 3/2001 | Demar | |
| 6,234,897 | B1 | 5/2001 | Frohm | |
| 6,251,013 | B1 | 6/2001 | Bennett | |
| 6,254,481 | B1 * | 7/2001 | Jaffe | 463/20 |
| 6,261,177 | B1 | 7/2001 | Bennett | |
| 6,270,405 | B1 | 8/2001 | Ferguson | |
| 6,270,411 | B1 | 8/2001 | Gura | |
| 6,290,600 | B1 | 9/2001 | Glasson | |
| 6,311,976 | B1 | 11/2001 | Yoseloff | |
| 6,312,334 | B1 | 11/2001 | Yoseloff | |
| 6,315,660 | B1 | 11/2001 | DeMar | |
| 6,317,128 | B1 | 11/2001 | Harrison | |
| 6,322,309 | B1 | 11/2001 | Thomas | |
| 6,334,613 | B1 | 1/2002 | Yoseloff | |
| 6,346,043 | B1 | 2/2002 | Colin | |
| 6,347,996 | B1 * | 2/2002 | Gilmore et al. | 463/17 |
| 6,354,939 | B1 | 3/2002 | Morita | |
| 6,364,766 | B1 | 4/2002 | Anderson | |
| 6,368,216 | B1 | 4/2002 | Hedrick | |
| 6,375,570 | B1 * | 4/2002 | Poole | 463/31 |
| 6,380,956 | B1 | 4/2002 | Yee | |
| 6,398,220 | B1 | 6/2002 | Inoue | |
| 6,428,412 | B1 * | 8/2002 | Anderson et al. | 463/9 |
| 6,435,509 | B2 | 8/2002 | Wichinsky | |
| 6,443,837 | B1 | 9/2002 | Jaffe | |
| 6,454,266 | B1 | 9/2002 | Breeding | |
| 6,482,089 | B2 | 11/2002 | DeMar | |
| 6,505,117 | B1 | 1/2003 | Ratert | |
| 6,506,116 | B1 | 1/2003 | Sunaga | |
| 6,508,707 | B2 | 1/2003 | DeMar | |
| 6,517,432 | B1 | 2/2003 | Jaffe | |
| 6,520,855 | B2 | 2/2003 | DeMar | |
| 6,529,626 | B1 | 3/2003 | Watanabe | |
| 6,533,660 | B2 | 3/2003 | Seelig | |
| 6,554,704 | B2 | 4/2003 | Nicastro | |
| 6,569,018 | B2 | 5/2003 | Jaffe | |
| 6,582,305 | B1 | 6/2003 | Carter | |
| 6,587,118 | B1 | 7/2003 | Yoneda | |
| 6,607,437 | B2 | 8/2003 | Casey | |
| 2002/0119818 | A1 | 8/2002 | Savio | |

FOREIGN PATENT DOCUMENTS

| | | | |
|---|---|---|---|
| AU | 1997/45197 | | 1/1998 |
| AU | 1999/42504 | | 12/1999 |
| AU | 1999/43488 | | 3/2000 |
| DE | 2938307 | | 4/1981 |
| DE | 4426658 | | 1/1996 |
| EP | 0368628 | | 5/1990 |
| GB | 1535095 | | 12/1978 |
| GB | 2056737 | | 3/1981 |
| GB | 2072395 | | 9/1981 |
| GB | 2098778 | | 11/1982 |
| GB | 2137392 | | 10/1984 |
| GB | 2229371 | A * | 9/1990 |
| GB | 2233241 | A * | 1/1991 |
| GB | 2252705 | A * | 8/1992 |
| GB | 2271262 | A * | 4/1994 |
| JP | 04-114676 | | 4/1992 |
| WO | WO93/03464 | | 2/1993 |
| WO | WO96/08799 | | 3/1996 |
| WO | WO97/31344 | | 8/1997 |
| WO | WO97/32285 | | 9/1997 |
| WO | WO99/64997 | | 12/1999 |
| WO | WO00/32286 | | 6/2000 |
| WO | WO01/28647 | | 4/2001 |
| WO | WO01/89646 | | 11/2001 |
| WO | WO01/89647 | | 11/2001 |

OTHER PUBLICATIONS

Communication to Australian Commissioner of Patents , dated Sep. 15, 2004 , in Application 200210214 (PR2941).

Lara Croft Tomb Raider Web Page, http://shopping.yahoo.com/shop?d=zvgm%id=1951008664&clink=dmks/Tomb_Raider, p. 1.

* cited by examiner

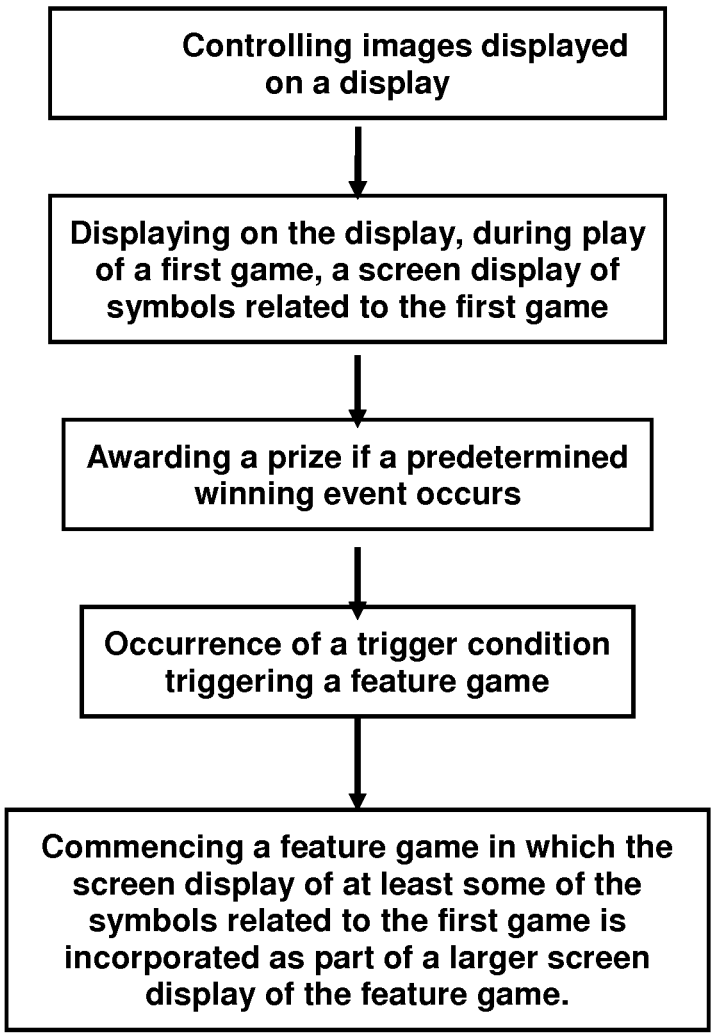
FIG. 14
NEW

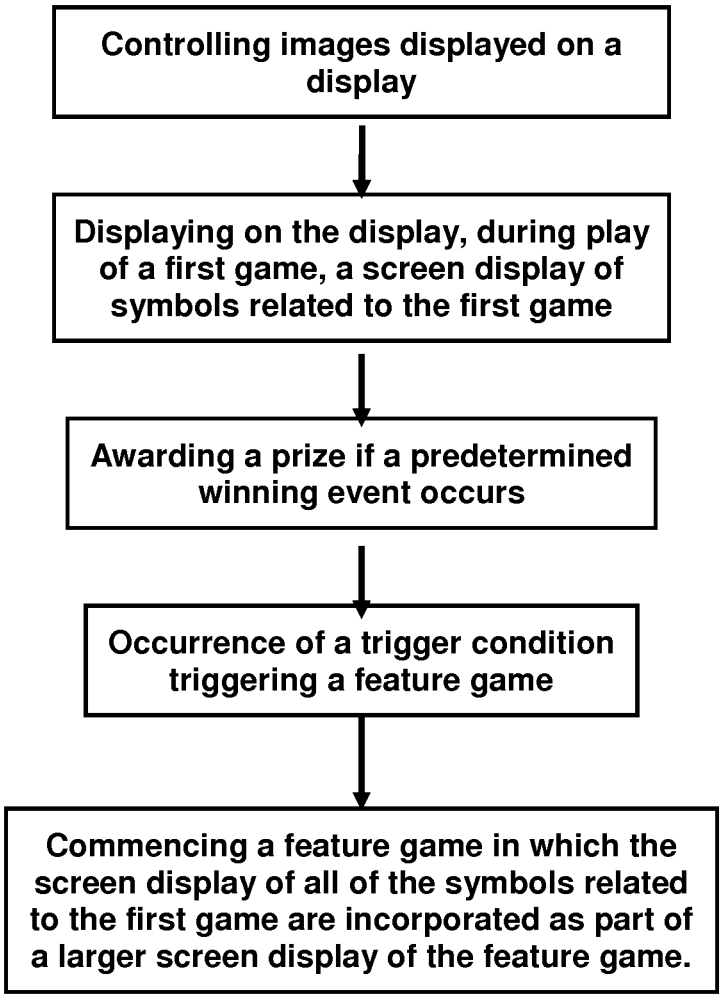
FIG. 15
NEW

REEL STRIP INTERACTION

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 7,192,345. The reissue applications are the present application, which is reissue application Ser. No. 12/407,125, filed on Mar. 19, 2009, and a continuation of the present reissue application, which is application Ser. No. 12/407,332, field Mar. 19, 2009.*

RELATED APPLICATIONS

This application claims the benefit of the Australian application PRL 947 filed Dec. 7, 2000.

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the games as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

SUMMARY OF THE INVENTION

According to the invention, there is provided a gaming machine having a display means and a game control means arranged to control images displayed on the display means, the game control means being arranged to play a game wherein at least one random event is caused to be displayed on the display means and, if a predefined winning event occurs, the machine awards a prize, the gaming machine being characterized in that, during the playing of a first game, symbols related to that first game are displayed on the display means and, when a trigger condition occurs, a feature game is commenced in which an arrangement of at least some of the symbols of the first game are incorporated as part of a larger image which constitutes an image of the feature game, the at least some symbols of the first game contributing to an outcome of the feature game.

The first game may be any suitable base game played on an electronic gaming machine. For ease of explanation, the invention will be described with reference to the base game being a spinning reel game. The display screen for the base game may thus display a video simulation of a number of reels. For example, five such reels, each showing three symbols, may be displayed.

When the trigger condition occurs, a screen display of the first game may be incorporated into the image of the feature game and may be used in the playing of the feature game. The screen display which is incorporated into the image of the feature game may be the arrangement of the reels as they were when the trigger condition occurred. For example, the screen display of the first game comprising the image of reels may move backwards to be surrounded by, and become part of, another image.

Instead, an effect may be created by the control means of zooming out from the screen display of the reels to show that the screen display of the reels of the first game is part of the larger image such as a pinball game.

Further, the image of the feature game may have a width greater than a width of the display means and the control means may impart a panning effect to display different parts of the image of the feature game.

The trigger condition may be constituted by an event in the first game, for example, as a result of a particular combination of symbols being displayed. Instead, the trigger condition may occur independently of the first game.

BRIEF DESCRIPTION OF THE DRAWINGS

The invention is now described by way of example with reference to the accompanying diagrammatic drawings in which:

*FIGS. 14 and 15 are a flow charts describing methods for use of a gaming machine according to embodiments of the present invention.*

DETAILED DESCRIPTION OF THE DRAWINGS

Figure 1:
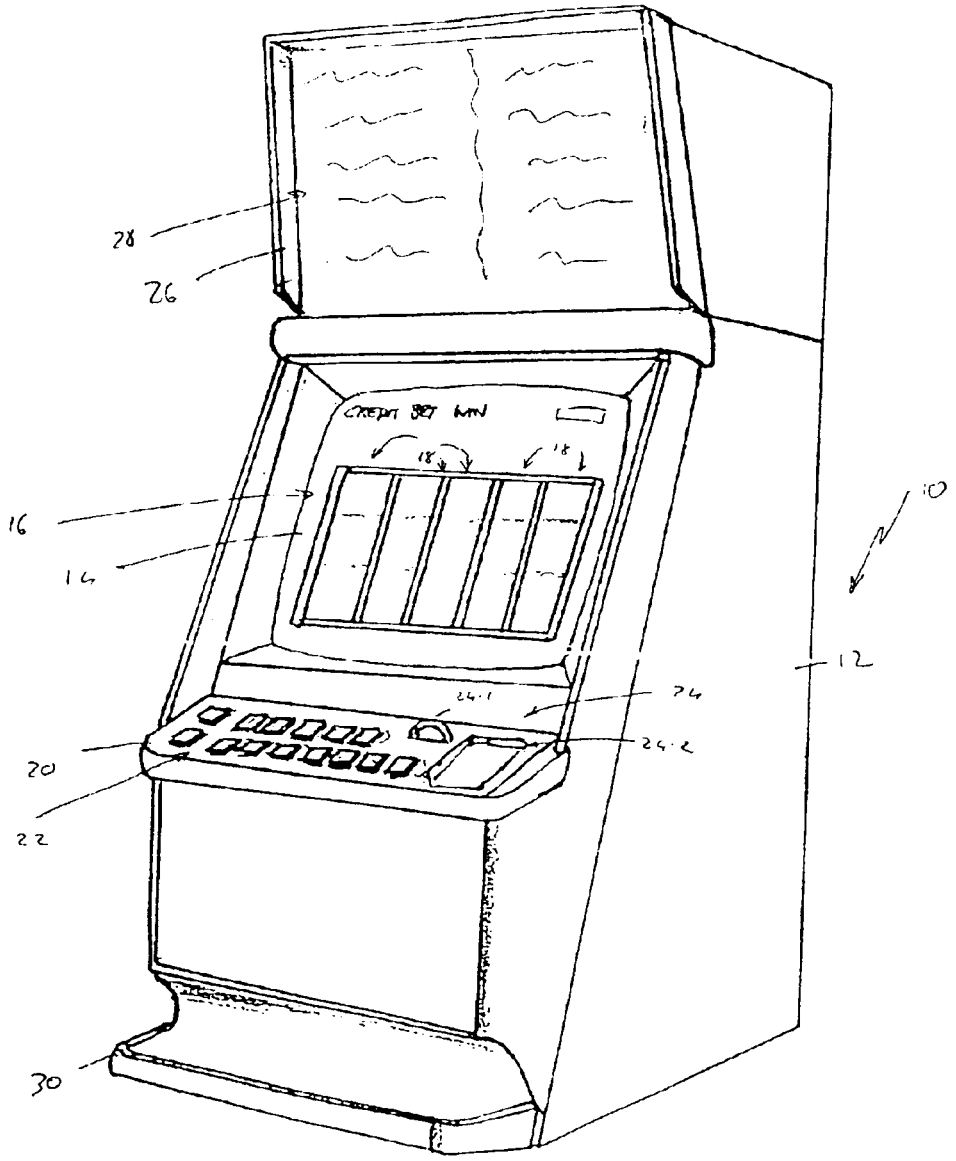
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The preferred form of a base game of the game 16 is a spinning reel game which simulates the rotation of a number of spinning reels 18. It will, however, be appreciated that the invention is equally applicable to other types of base games such as card games or ball games such as Keno, or the like.

A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
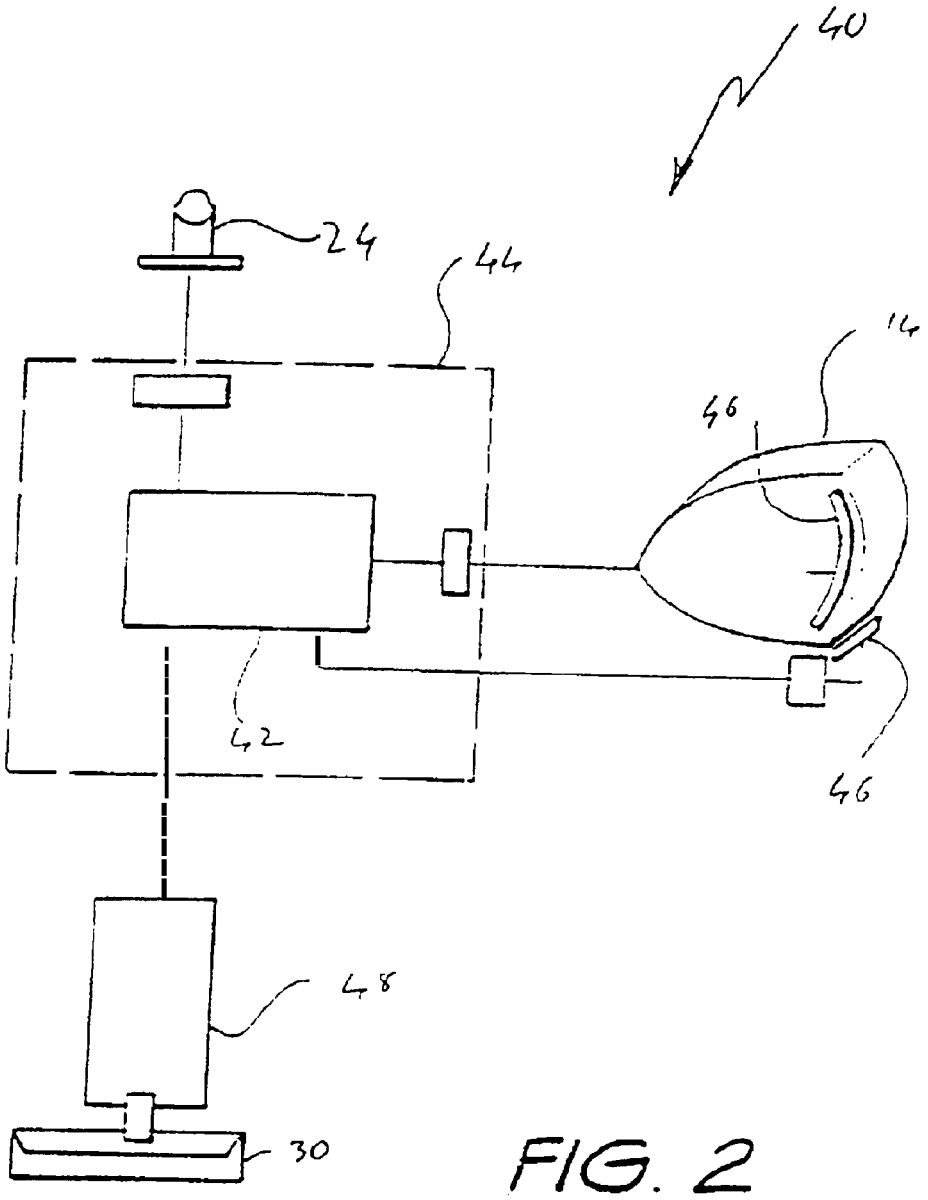
FIG. 2 shows a block diagram of a control circuit of the gaming machine.

Referring now to FIG. 2 of the drawings, a control means or control circuit 40 is illustrated. A program which implements the game and user interface is run on a processor 42 of the control circuit 40. The processor 42 forms part of a controller 44 which drives the screen of the video display unit 14 and which receives input signals from sensors 46. The sensors 46 include sensors associated with the bank 22 of buttons and touch sensors mounted in the screen 16. The controller 36 also receives input pulses from the mechanism 24 to determine whether or not a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

For ease of explanation, the invention will be described with reference to a base game being a spinning reel game having a video simulation of spinning reels 18.

In use, when a trigger condition occurs, either in the base game or independently of the base game, a feature game is commenced.

Figure 3:
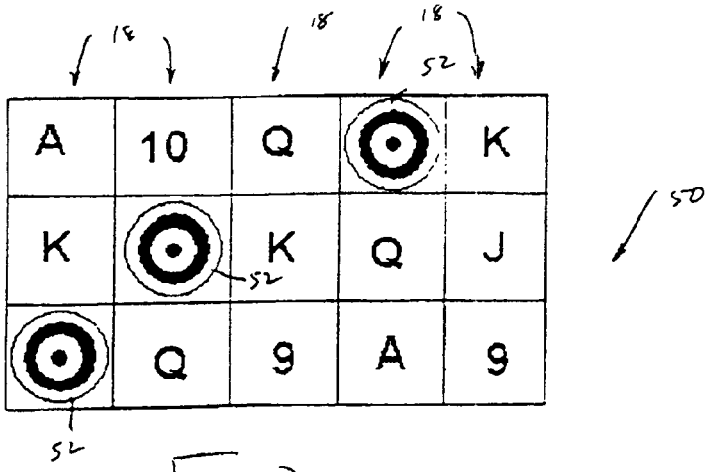
FIGS. 3 and 4 show screen displays of a first embodiment of a game played on the gaming machine of FIG. 1.
Figure 4:
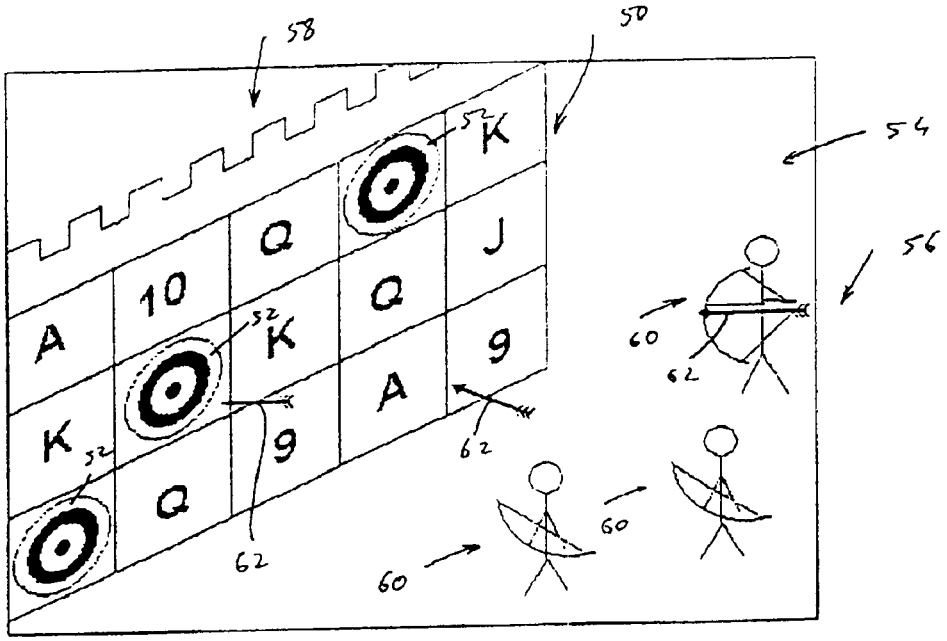

Referring now to FIGS. 3 and 4 of the drawings, a first embodiment of the invention is described in greater detail. Initially, a spinning reel game is played as a first or base game and an example of a screen display of a result of the base game is illustrated in FIG. 3 of the drawings. In this embodiment of the invention, the trigger condition arises due to the occurrence of three target symbols 52 on the reels 18, the trigger condition triggering a feature game.

When the trigger condition occurs which gives rise to the feature game, the entire screen display 50 appears to move so that the screen display 50 forms a part of a larger montage or image 54 of a new screen display 56 of the feature game as shown in FIG. 4 of the drawings. Accordingly, when the trigger condition, being the three target symbols 52 occurs, the representation of the five reels forming the screen display 50 moves backwards so that it forms part of a wall 58 of a castle in the larger image 54 displayed in the screen display 56 in FIG. 4 of the drawings.

In the feature game, a plurality of archers 60 is displayed in the image 54. The archers fire arrows 62 at the wall 58. Prizes are awarded for the arrows 62 which strike any of the target symbols 52. Instead, or in addition, when an arrow 62 strikes any symbol of the display 50, the arrow 62 substitutes for that symbol. The arrows 62 may be flaming arrows and, provided the arrows 62 continue burning, they continue to substitute in addition to further arrows fired at the wall 58.

Figure 5:
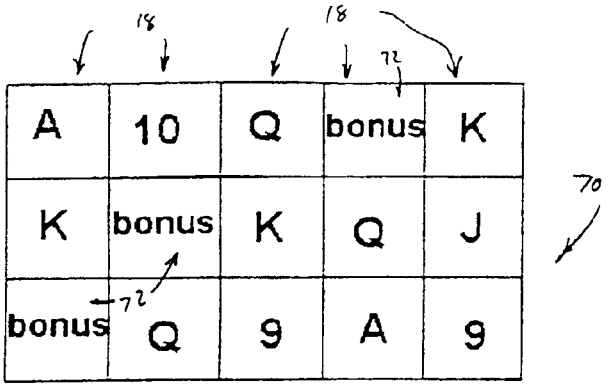
FIGS. 5 and 6 show screen displays of a second embodiment of a game played on the gaming machine of FIG. 1.
Figure 6:
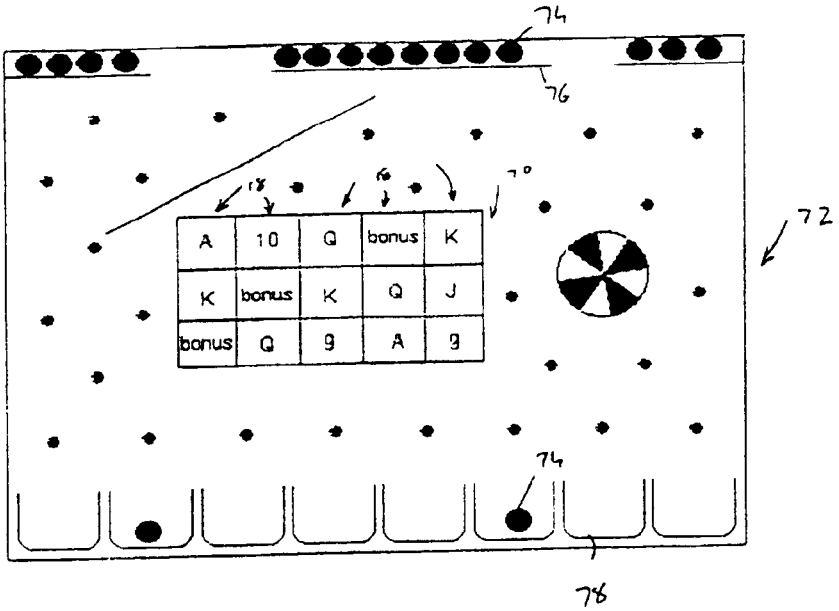

In FIGS. 5 and 6, another embodiment of the invention is illustrated. In this embodiment, an example of a screen display 70 of a base game is illustrated. Once again, the base game is a spinning reel game. In this embodiment, a trigger condition occurs when three bonus symbols 72 are spun up.

In an effect similar to a camera zooming out, a zooming-type effect of the screen display 70 takes place to reveal that the screen display 70 is in fact a part of a larger game indicated by screen display 72 in FIG. 6 of the drawings. The larger game 72 is a pinball-style feature game such as the Applicant's version of a pachinko game, sold under the Applicant's trade mark of "Arishinko". Bonuses are awarded as balls 74 drop from racks 76 and land in buckets 78 at the bottom of the screen display.

The reels 18 of the spinning reel game spin while the balls 74 drop to give additional prizes over and above prizes for the balls 74 landing in the bucket 78. These additional prizes may include standard wins from a series of free games on the spinning reels 18.

Figure 7:
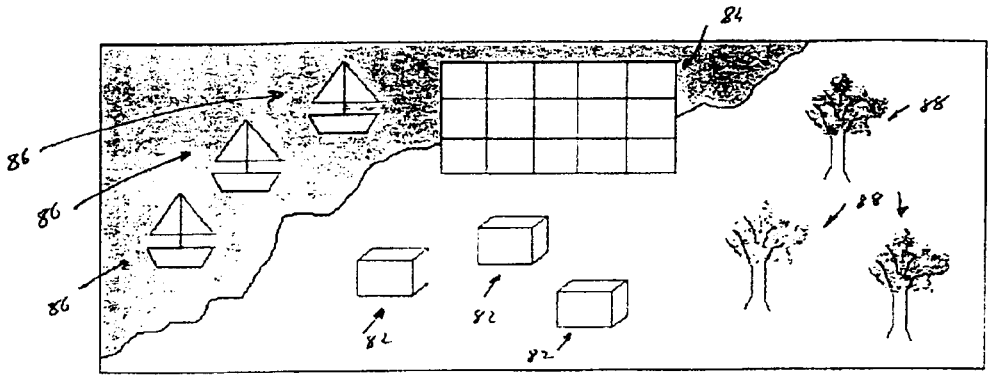
FIGS. 7 to 10 show screen displays of a third embodiment of a game played on the gaming machine of FIG. 1.

Referring now to FIGS. 7 to 10 of the drawings, a third embodiment of the invention is shown. A game screen 80, which is longer than a width of the video display unit 14 of the gaming machine 10, is shown in FIG. 7 of the drawings. Naturally, due to the fact that the game screen 80 is longer than the width of the video display unit 14, only a part or segment thereof is visible at any one time.

Figure 8:
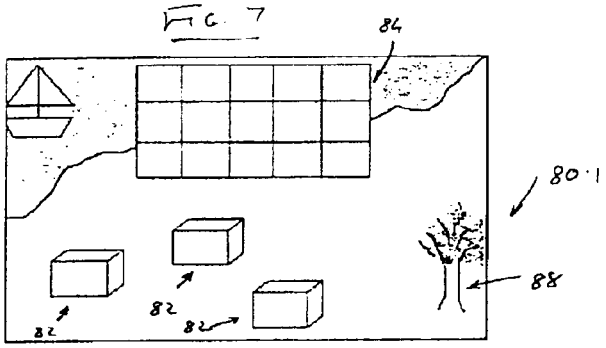
Figure 9:
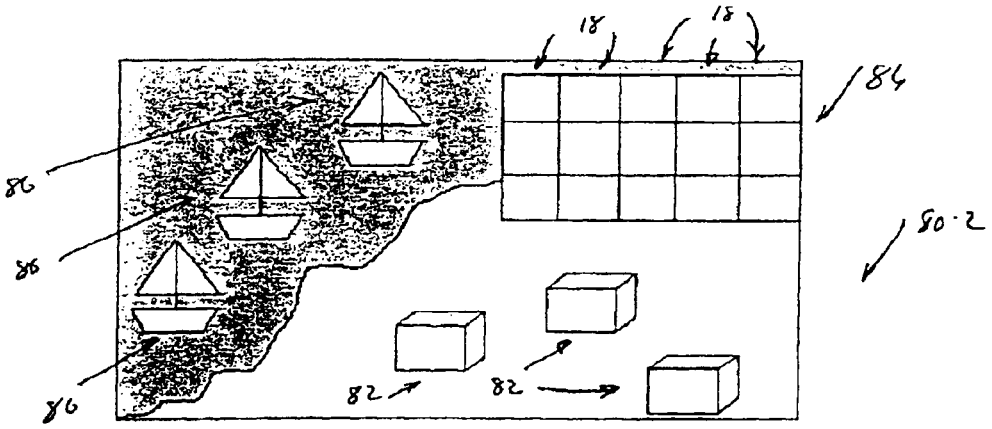

Consequently, upon initiation of the feature game a first segment 80.1 of the game screen, as shown in FIG. 8 of the drawings, is visible on the video display unit 14.

Amongst the items displayed in the game screen 80 are treasure chests 82. When the segment 80.1 is displayed, the player is required to choose from one of the treasure chests 82. It is to be noted that the original screen from the base game, designated in this embodiment by reference numeral 84, is incorporated or embedded in the game screen 80 and the perspective of the picture is such that the treasure chests 82 appear to be arranged in front of the screen 84.

Once the player has chosen one of the treasure chests 82, the chosen treasure chest 82 opens. A number of free games will be revealed from the treasure chest 82 chosen by the player.

Figure 10:
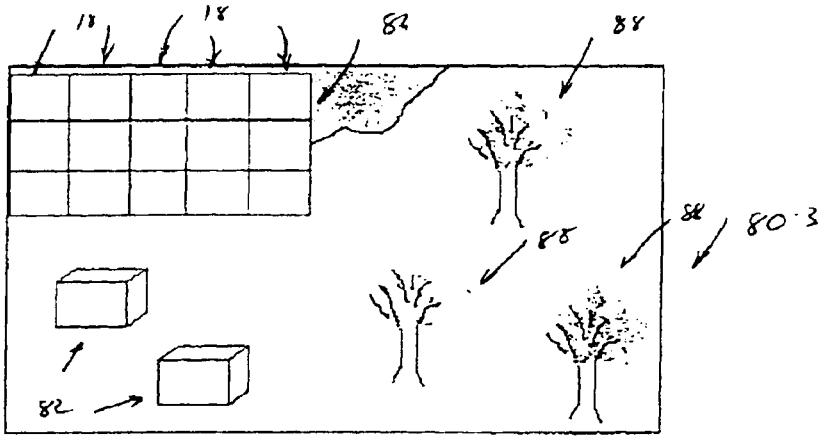

The free games are played on the embedded screen 84. During the free games the screen scrolls or pans horizontally from the segment 80.1 to one of segments 80.2 (FIG. 9) or 80.3 (FIG. 10).

When the segment 80.2 becomes visible, boats 86 in the image may "shoot" cannon balls on to the reels 18 of the embedded screen 84. Where a cannon ball strikes any symbol on one of the reels 18, it substitutes for any of those symbols on the reel 18. Accordingly, bonus prizes are given which are higher than they would normally be for that free game.

The screen 80 then scrolls or pans to reveal the segment 80.3. In this segment, birds such as parrots (not shown) "fly" from trees 88 carrying special symbols which they may place on predetermined symbol display positions on the reels 18 of the embedded screen 84. The special symbols determine additional wins for the free game.

It will be appreciated that the original screen display 80 may be even larger than that illustrated and other bonuses may occur during the feature game. For example, the boats 86 may sail from one island to another to reveal more features or another set of reel strips.

Figure 11:
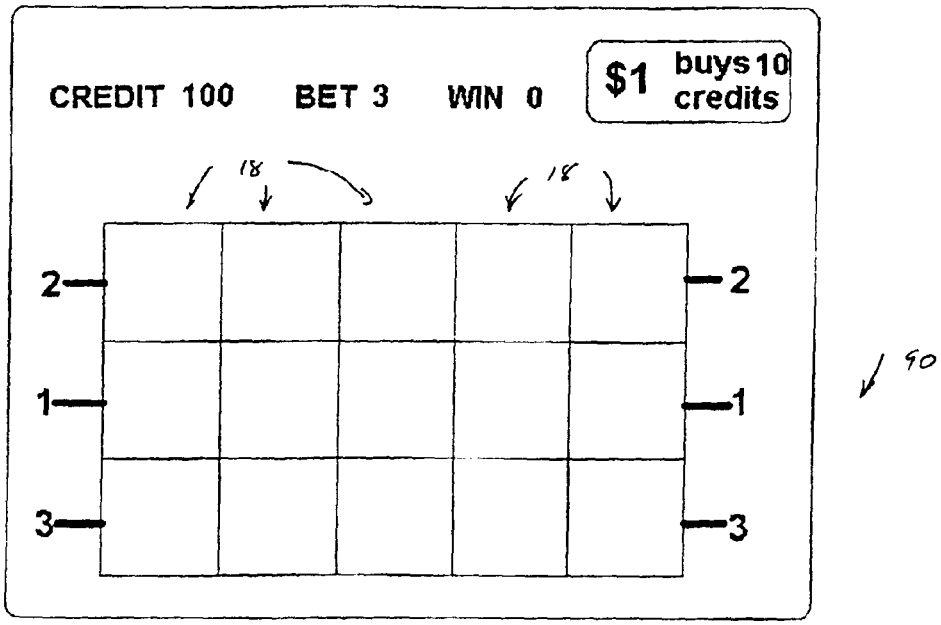
FIGS. 11 to 13 show screen displays of a fourth embodiment of a game played on the gaming machine of FIG. 1.
Figure 12:
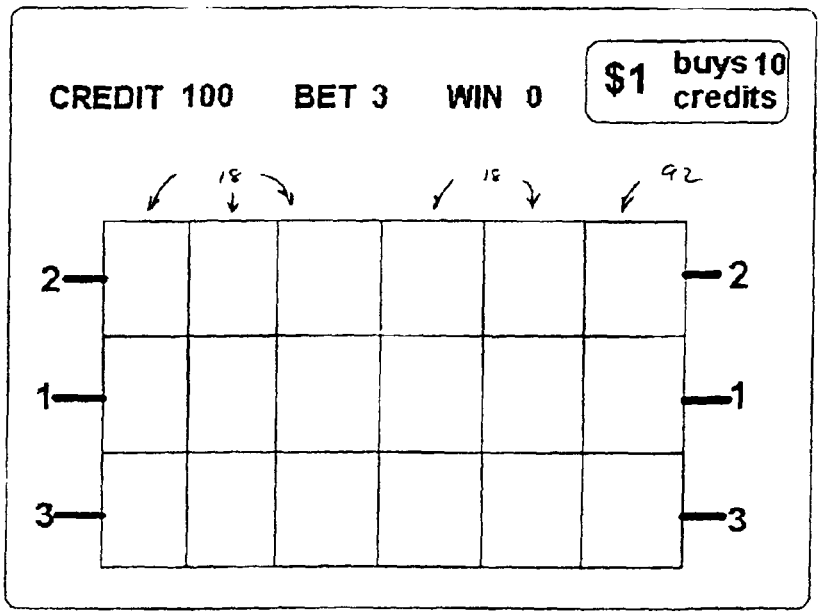
Figure 13:
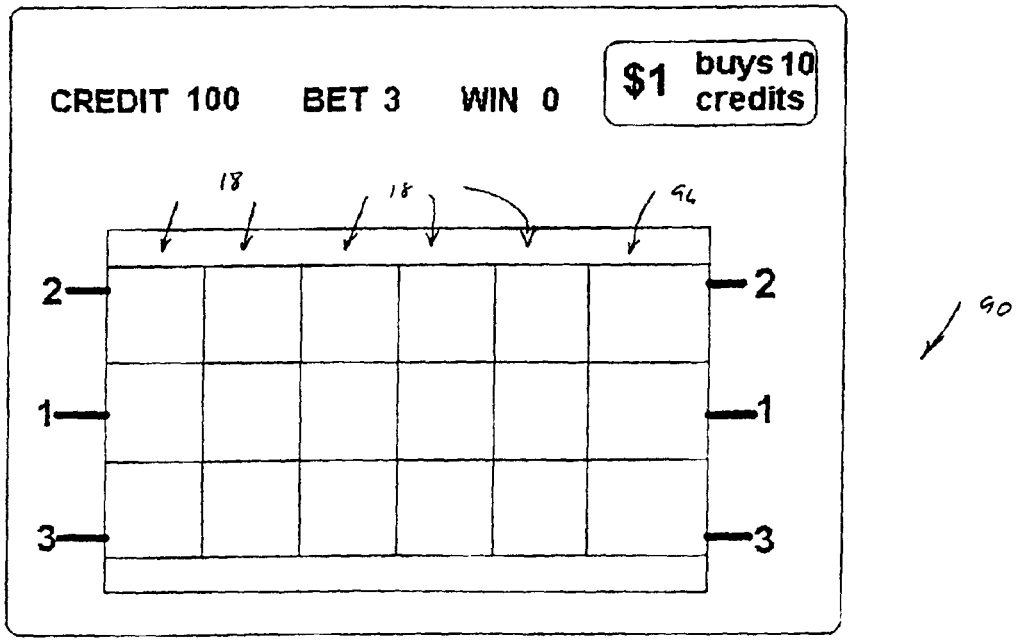

Referring now to FIGS. 11 to 13, another embodiment of the invention is illustrated.

In this embodiment, a basic screen is designated generally by the reference numeral 90. The basic screen 90 has the conventional five reels 18. When a suitable trigger condition occurs (not shown) the reels 18 "shrink" as shown in FIG. 12 of the drawings, to reveal a sixth reel 92. Instead, as shown in FIG. 13 of the drawings, the screen "zooms out" to reveal a sixth reel 94.

Accordingly, it is an advantage of the invention that a game is provided which, the Applicant believes, will enhance player interest and encourage playing of the game by providing entertaining features.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A gaming machine having a display and a game controller arranged to control images displayed on the display, the game controller being arranged to play a game wherein at least one random event is caused to be displayed on the display and, if a predefined winning event occurs, the machine awards a prize, wherein the gaming machine, during the playing of a first game, displays a screen display of symbols related to that first game on the display and, when a trigger condition occurs, commences a feature game in which the screen display of the symbols related to the first game is incorporated as part of a larger screen display of the feature game displayed on the display, at least some of the symbols of the first game contributing to an outcome of the feature game, wherein when the trigger condition occurs, the screen display of the first game is incorporated into an image of the feature game and is used in the playing of the feature game, the screen display of the first game moving backwards to be surrounded by, and becoming part of, the larger screen display of the feature game.

2. The gaming machine of claim 1, wherein the trigger condition comprises an event in the first game.

3. The gaming machine of claim 1 in which the trigger condition occurs independently of the first game.

4. The gaming machine of claim 1 in which the first game is a spinning reel game and the screen display of the first game is a screen display of a plurality of spinning reels.

5. A gaming machine having a display and a game controller arranged to control images displayed on the display, the game controller being arranged to play a game wherein at least one random event is caused to be displayed on the display and, if a predefined winning event occurs, the machine awards a prize, wherein the gaming machine, during the playing of a first game, displays a screen display of symbols related to that first game on the display and, when a trigger condition occurs, commences a feature game in which the screen display of the symbols related to the first game is incorporated as part of a larger screen display of the feature game displayed on the display, at least some of the symbols of the first game contributing to an outcome of the feature game, wherein when the trigger condition occurs, the screen display of the first game is incorporated into an image of the feature game and is used in the playing of the feature game and wherein an effect is created by the game controller of zooming out from the screen display of the first game to show that the screen display of the first game is part of the larger screen display of the feature game.

6. A gaming machine having a display and a game controller arranged to control images displayed on the display, the game controller being arranged to play a game wherein at least one random event is caused to be displayed on the display and, if a predefined winning event occurs, the machine awards a prize, wherein the gaming machine, during the playing of a first game, displays a screen display of symbols related to that first game on the display and, when a trigger condition occurs, commences a feature game in which the screen display of the symbols related to the first game is incorporated as part of a larger screen display of the feature game displayed on the display, at least some of the symbols of the first game contributing to an outcome of the feature game, wherein when the trigger condition occurs, the screen display of the first game is incorporated into an image of the feature game and is used in the playing of the feature game and wherein an image of the feature game has a width greater than a width of the display and the game controller imparts a panning effect to display different parts of the image of the feature game.

*7. A method for use with a gaming machine having a display and a game controller arranged to play a game wherein at least one random event is caused to be displayed on the display, the method comprising:*

*controlling images displayed on the display, the displayed images being controlled by the game controller;*

*displaying on the display, during play of a first game, a screen display of symbols related to the first game;*

*awarding a prize if a predetermined winning event occurs; and*

*subsequent to a trigger condition occurring, commencing a feature game in which the screen display of the first game is incorporated as part of a larger screen display of the feature game and is used in the playing of the feature game, wherein at least some of the symbols related to the first game contribute to an outcome of the feature game and wherein the screen display of symbols related to the first game is displayed as moving backwards to be surrounded by, and becoming part of the larger screen display of the feature game.*

*8. The method of claim 7 wherein said feature game includes all of said symbols related to the first game.*

*9. A method for use with a gaming machine having a display and a game controller arranged to play a game wherein at least one random event is caused to be displayed on the display, the method comprising:*

*controlling images displayed on the display, the displayed images being controlled by the game controller;*

*displaying on the display, during play of a first game, a screen display of symbols related to the first game;*

*awarding a prize if a predetermined winning event occurs; and*

*subsequent to a trigger condition occurring, commencing a feature game in which the screen display of the first game is incorporated as part of a larger screen display of the feature game and is used in the playing of the feature game, wherein at least some of the symbols related to the first game contribute to an outcome of the feature game and wherein an effect is created by the game controller of zooming out from the screen display of the first game to show that the screen display of the first game is part of the larger screen display of the feature game.*

*10. The method of claim 9 wherein said feature game includes all of said symbols related to the first game.*

*11. A method for use with a gaming machine having a display and a game controller arranged to play a game wherein at least one random event is caused to be displayed on the display, the method comprising:*

*controlling images displayed on the display, the displayed images being controlled by the game controller;*

*displaying on the display, during play of a first game, a screen display of symbols related to the first game;*

*awarding a prize if a predetermined winning event occurs; and*

*subsequent to a trigger condition occurring, commencing a feature game in which the screen display of the first game is incorporated as part of a larger screen display of the feature game and is used in the playing of the feature game, wherein at least some of the symbols related to the first game contribute to an outcome of the feature game and wherein an image of the feature game has a width greater than a width of the screen display of the first game and the game controller imparts a panning effect to display different parts of the image of the feature game.*

*12. The method of claim 11 wherein said feature game includes all of said symbols related to the first game.*

* * * * *